US011627517B2

United States Patent
Lynn, Jr. et al.

(10) Patent No.: US 11,627,517 B2
(45) Date of Patent: *Apr. 11, 2023

(54) NETWORK PROVISIONING

(71) Applicant: Comcast Cable Communications, LLC, Philadelphia, PA (US)

(72) Inventors: Thomas William Lynn, Jr., Berryville, VA (US); Yash Lachmandas Khemani, Falls Church, VA (US); Henry Lu, Herndon, VA (US); Phillip Andrew Sanderson, Mount Laurel, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,252

(22) Filed: Jul. 13, 2018

(65) Prior Publication Data
US 2019/0208458 A1 Jul. 4, 2019

Related U.S. Application Data

(63) Continuation of application No. 13/732,906, filed on Jan. 2, 2013, now Pat. No. 10,070,369.

(51) Int. Cl.
*H04W 4/00* (2018.01)
*H04W 40/32* (2009.01)
*H04L 12/46* (2006.01)
*H04W 40/20* (2009.01)
(Continued)

(52) U.S. Cl.
CPC ......... *H04W 40/32* (2013.01); *H04L 12/4625* (2013.01); *H04L 12/4633* (2013.01); *H04L 12/4645* (2013.01); *H04L 61/5014* (2022.05); *H04W 40/20* (2013.01); *H04W 64/003* (2013.01)

(58) Field of Classification Search
CPC .......... H04L 12/28; H04W 4/08; H04W 88/08
See application file for complete search history.

(56) References Cited

U.S. PATENT DOCUMENTS 7,471,679 B2 12/2008 Lee
7,564,801 B2 7/2009 Narayanan
7,616,613 B2 11/2009 Sanzgiri et al.
(Continued)

FOREIGN PATENT DOCUMENTS

CA 2850874 4/2014
EP 1075118 A2 2/2001
(Continued)

OTHER PUBLICATIONS

Aggarwal et al., "Signaling Tunnel Encapsulation/Deencapsulation Capabilities", Feb. 2003, Network Working Group Internet Draft, 9 Pages.
(Continued)

*Primary Examiner* — Abdelillah Elmejjarmi
(74) *Attorney, Agent, or Firm* — Ballard Spahr LLP

(57) ABSTRACT

Systems and methods for provisioning and managing a network are disclosed. One method can comprise determining location information of one or more access points and selecting a routing device based upon the location information. Communication can be established between the one or more access points and the select routing device to define a mobility group comprising the one or more access points.

20 Claims, 9 Drawing Sheets

(51) Int. Cl.
  *H04W 64/00* (2009.01)
  *H04L 61/5014* (2022.01)

(56) References Cited

U.S. PATENT DOCUMENTS

| | | | |
|---|---|---|---|
| 7,801,021 B1 | 9/2010 | Triantafillis et al. | |
| 7,898,977 B2* | 3/2011 | Roese | G01S 5/02 |
| | | | 370/254 |
| 8,018,956 B1 | 9/2011 | Deng et al. | |
| 8,279,759 B1 | 10/2012 | Jones | |
| 8,400,910 B1 | 3/2013 | Busch et al. | |
| 8,787,150 B2 | 7/2014 | Fiorone et al. | |
| 9,203,689 B2 | 12/2015 | Nahum | |
| 9,344,397 B2 | 5/2016 | Iyer | |
| 10,021,027 B2 | 7/2018 | Lynn, Jr. et al. | |
| 10,070,369 B2 | 9/2018 | Lynn et al. | |
| 2003/0074430 A1* | 4/2003 | Gieseke | H04L 41/0213 |
| | | | 709/224 |
| 2003/0110276 A1 | 6/2003 | Riddle | |
| 2004/0013118 A1 | 1/2004 | Borella | |
| 2004/0017769 A1 | 1/2004 | Denecheau | |
| 2004/0184458 A1 | 9/2004 | Shimada | |
| 2004/0202183 A1 | 10/2004 | Thubert et al. | |
| 2004/0228343 A1 | 11/2004 | Molten et al. | |
| 2004/0261116 A1* | 12/2004 | Mckeown | H04L 12/2801 |
| | | | 725/109 |
| 2005/0015810 A1 | 1/2005 | Gould et al. | |
| 2006/0092964 A1 | 5/2006 | Park et al. | |
| 2007/0064661 A1* | 3/2007 | Sood | H04L 29/12396 |
| | | | 370/338 |
| 2007/0280135 A1 | 12/2007 | Syed | |
| 2008/0013474 A1* | 1/2008 | Nagarajan | H04L 12/4633 |
| | | | 370/321 |
| 2008/0080507 A1 | 4/2008 | Swallow | |
| 2008/0123521 A1 | 5/2008 | Vasseur et al. | |
| 2008/0144641 A1 | 6/2008 | Le Roux et al. | |
| 2008/0195733 A1 | 8/2008 | Detienne et al. | |
| 2008/0291920 A1 | 11/2008 | Serbest et al. | |
| 2009/0075672 A1* | 3/2009 | Jones | H04W 64/00 |
| | | | 455/456.1 |
| 2010/0002578 A1 | 1/2010 | Fiorone et al. | |
| 2010/0138651 A1* | 6/2010 | Wang | H04L 63/08 |
| | | | 709/229 |
| 2010/0260146 A1* | 10/2010 | Lu | H04L 12/4633 |
| | | | 455/432.1 |
| 2011/0055622 A1 | 3/2011 | Arai et al. | |
| 2011/0158162 A1 | 6/2011 | Mizikovsky et al. | |
| 2011/0177813 A1* | 7/2011 | Uemura | H04W 76/18 |
| | | | 455/435.1 |
| 2011/0310787 A1 | 12/2011 | Sheriff | |
| 2012/0110152 A1 | 5/2012 | Wing et al. | |
| 2012/0236708 A1 | 9/2012 | Kompella et al. | |
| 2013/0058345 A1 | 3/2013 | Kano | |
| 2013/0157585 A1* | 6/2013 | Naruszewicz | H04W 24/02 |
| | | | 709/224 |
| 2013/0238811 A1 | 9/2013 | Chidambaram et al. | |
| 2013/0259060 A1 | 10/2013 | Liu et al. | |
| 2013/0311637 A1* | 11/2013 | Kamath | H04L 12/4633 |
| | | | 709/224 |
| 2013/0336103 A1 | 12/2013 | Vasseur et al. | |
| 2013/0336116 A1 | 12/2013 | Vasseur et al. | |
| 2014/0018037 A1 | 1/2014 | Shanmugavadivel et al. | |
| 2014/0146735 A1* | 5/2014 | Poola | H04L 12/4633 |
| | | | 370/312 |
| 2014/0157042 A1 | 6/2014 | Johnson et al. | |
| 2014/0185536 A1 | 7/2014 | Lynn et al. | |
| 2014/0204730 A1 | 7/2014 | Sampath | |
| 2014/0321277 A1 | 10/2014 | Lynn, Jr. et al. | |
| 2015/0063331 A1* | 3/2015 | Scahill | H04W 48/00 |
| | | | 370/338 |
| 2019/0124005 A1 | 4/2019 | Lynn, Jr. et al. | |

FOREIGN PATENT DOCUMENTS

| | | |
|---|---|---|
| EP | 14166418.5 | 4/2014 |
| GB | 2485024 A | 5/2012 |
| WO | WO-2008/043374 A1 | 4/2008 |
| WO | WO-2012/035366 A1 | 3/2012 |

OTHER PUBLICATIONS

Alcatel Lucent, "7750 SR OS Triple Play Guide", Software version 7750 SR OS 10.0.R4, Jul. 2012, Document Part No. 93-0098-08-02, 26 Pages.
Lee, et al. "Dynamic Load-Balancing and Failover for Wireless Base Station", ip.com Journal, ip.com Inc., West Henrietta, NY, US, Jul. 18, 2011.
European Search Report and Written Opinion were dated Aug. 6, 2014 by the European Patent Office for EP Application No. 14166418. 5, filed on Apr. 29, 2014 and published as EP2800308 on Nov. 5, 2014(Applicant—Comcast Cable Communications, LLC).
U.S. Appl. No. 13/874,008 (U.S. Pat. No. 10,021,027), filed Apr. 30, 2013 (Jul. 10, 2018), Thomas William Lynn.
U.S. Appl. No. 15/985,394, filed May 21, 2018, Thomas William Lynn.
U.S. Appl. No. 13/732,906 (U.S. Pat. No. 10,070,369), filed Jan. 2, 2013 (Sep. 4, 2018), Thomas William Lynn.
Khadilkar, M., Feamster, N., Sanders, M., & Clark, R. (2007). Usage-based DHCP lease time optimization. In IMC'07: Proceedings of the 2007 ACM SIGCOMM Internet Measurement Conference (pp. 71-76). (Proceedings of the ACM SIGCOMM Internet Measurement Conference, IMC). (Year: 2007).
Droms, R.Bucknell University "Dynamic Host Configuration Protocol", Network Working Group, Request for Comments: 2131, Mar. 1997, 45 Pages (Year: 1997).

* cited by examiner

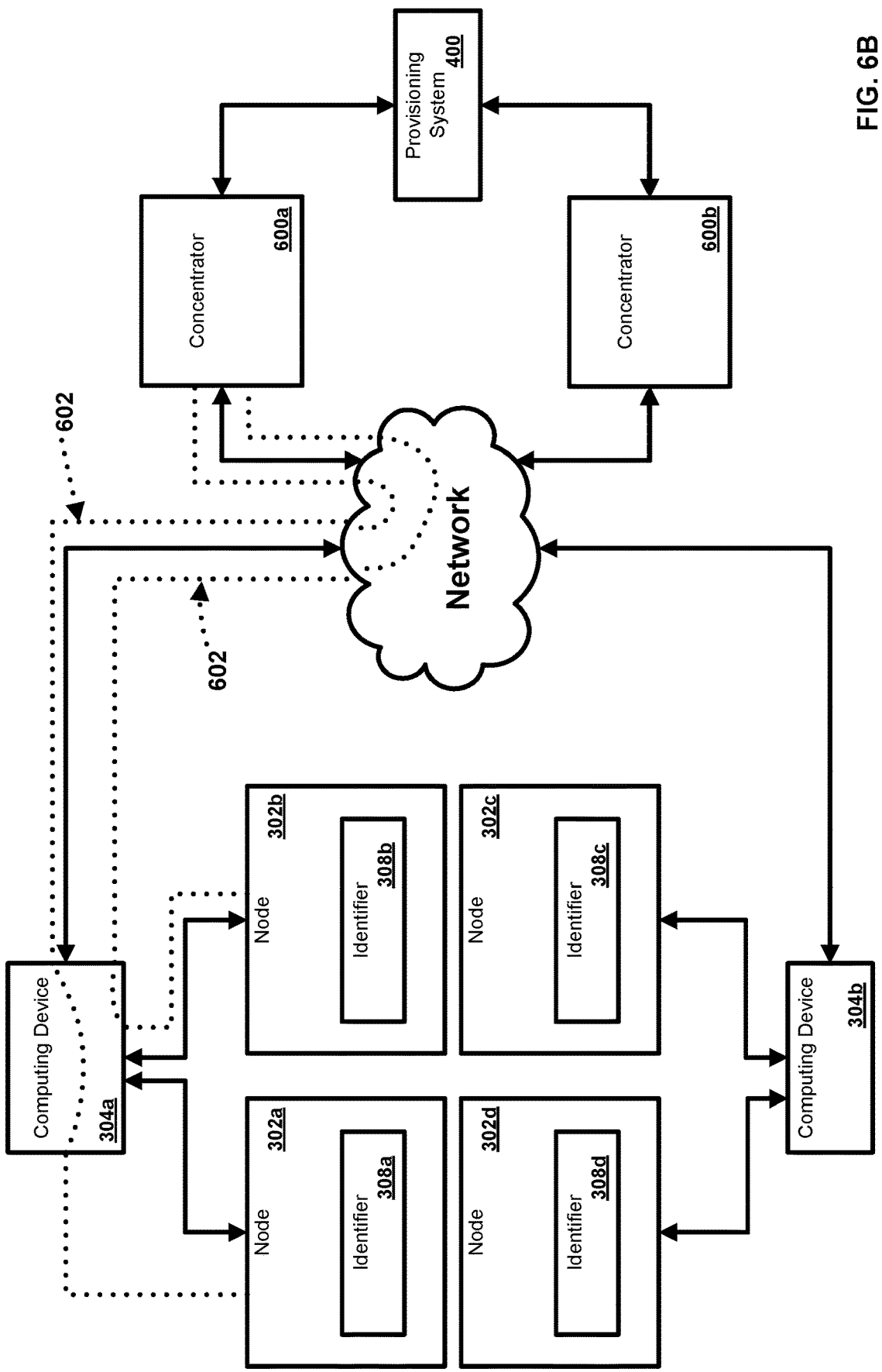

NETWORK PROVISIONING

CROSS-REFERENCE TO RELATED APPLICATION

The application is a continuation of U.S. patent application Ser. No. 13/732,906, filed Jan. 2, 2013, which is hereby incorporated by reference in its entirety.

BACKGROUND

A network, such as a wireless network, can comprise one or more access points (AP) to provide a means for one or more user devices to communicate with and/or over the network. An access point can comprise a device that allows wireless devices to connect to a wired network using Wi-Fi, Bluetooth, or related standards.

Network routing devices, such as a gateway or concentrator, can connect to AP's to manage network traffic. However, there is a limited number of AP's that any network routing device may be able to properly support. Provisioning AP's and assigning network routing devices to support the AP's can be complex and can result in deficient continuity of service for user devices roaming between the AP's. This disclosure addresses these and other shortcomings relating to network provisioning.

SUMMARY

It is to be understood that both the following general description and the following detailed description are exemplary and explanatory only and are not restrictive, as claimed. Provided are methods and systems for provisioning a network. The methods and systems described herein, in one aspect, can provision one or more access points of a network. As an example, provisioning AP tunnels to appropriate gateway endpoints can create optimal mobility groups. A mobility group can comprise one or more AP's in communication with a routing device such as a gateway. In an aspect, the mobility group can provide continuity of service to a user device communicating with the one or more access points of the mobility group.

In an aspect, the methods provided can comprise determining location information of one or more devices such as access points and selecting a routing device based upon the location information. Further, a mobility group can be established comprising the one or more access points or other devices. As an example, the mobility group can comprise the one or more access points and the select routing device.

In another aspect, the methods provided can comprise determining location information of a plurality of devices such as access points and classifying, for any purpose, one or more of the plurality of access points based upon the location information. A mobility group can be established comprising a subset of the plurality of devices such as access points. As an example, the mobility group can be established by transmitting provisioning information to the one or more access points.

In a further aspect, the methods provided can comprise detecting provisioning information of a first access point. A second access point can be identified within a proximity of the first access point. Further, the second access point can be provisioned based upon the provisioning of the first access point. As an example, the first access point and the second access point can form at least a portion of a mobility group.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 6B is a diagram of an exemplary system and network.

DETAILED DESCRIPTION

Figure 1:
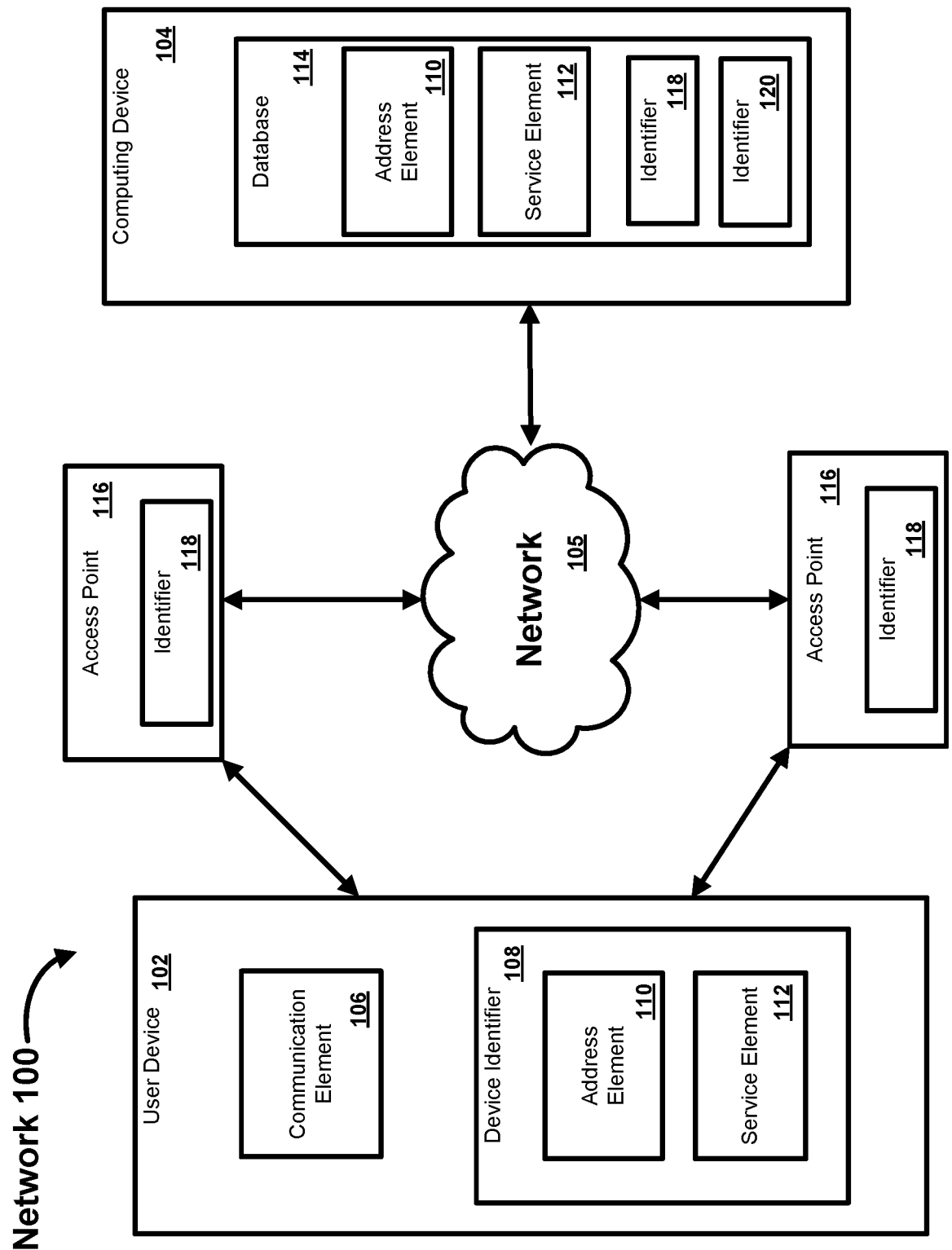
FIG. 1 is a block diagram of an exemplary system and network.

Before the present methods and systems are disclosed and described, it is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Disclosed are components that can be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that can be performed it is understood that each of these additional steps can be performed with any specific embodiment or combination of embodiments of the disclosed methods.

The present methods and systems may be understood more readily by reference to the following detailed description of preferred embodiments and the examples included therein and to the Figures and their previous and following description.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It will also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

The methods and systems described herein, in one aspect, can provision one or more access points of a network. As an example, provisioning AP tunnels to appropriate gateway endpoints can create optimal mobility groups. As a further example, a mobility group can comprise one or more AP's in communication with a routing device such as a gateway, concentrator, or the like. In an aspect, the mobility group can provide continuity of service to a user device communicating with the one or more AP's of the mobility group. As such, the user device can maintain service and/or provisioning (e.g., IP address), while the user device is connected to member devices of a mobility group.

FIG. 1 illustrates various aspects of an exemplary network in which the present methods and systems can operate. The present disclosure is relevant to systems and methods for providing services to a user device, for example. Those skilled in the art will appreciate that present methods may be used in various types of networks and systems that employ both digital and analog equipment. One skilled in the art will appreciate that provided herein is a functional description and that the respective functions can be performed by software, hardware, or a combination of software and hardware.

The network 100 can comprise a user device 102 in communication with a computing device 104 such as a server, for example. The computing device 104 can be disposed locally or remotely relative to the user device 102. As an example, the user device 102 and the computing device 104 can be in communication via a private and/or public network 105 such as the Internet. Other forms of communications can be used such as wired and wireless telecommunication channels, for example.

In an aspect, the user device 102 can be an electronic device such as a computer, a smartphone, a laptop, a tablet, a set top box, a display device, or other device capable of communicating with the computing device 104. As an example, the user device 102 can comprise a communication element 106 for providing an interface to a user to interact with the user device 102 and/or the computing device 104. The communication element 106 can be any interface for presenting information to the user and receiving user feedback such as a web browser (e.g., Internet Explorer, Mozilla Firefox, Google Chrome, Safari, or the like). Other software, hardware, and/or interfaces can be used to provide communication between the user and one or more of the user device 102 and the computing device 104. As an example, the communication element 106 can request or query various files from a local source and/or a remote source. As a further example, the communication element 106 can transmit data to a local or remote device such as the computing device 104.

In an aspect, the user device 102 can be associated with a user identifier or device identifier 108. As an example, the device identifier 108 can be any identifier, token, character, string, or the like, for differentiating one user or user device (e.g., user device 102) from another user or user device. In a further aspect, the device identifier 108 can identify a user or user device as belonging to a particular class of users or user devices. As a further example, the device identifier 108 can comprise information relating to the user device such as a manufacturer, a model or type of device, a service provider associated with the user device 102, a state of the user device 102, a locator, and/or a label or classifier. Other information can be represented by the device identifier 108.

In an aspect, the device identifier 108 can comprise an address element 110 and a service element 112. In an aspect, the address element 110 can be an internet protocol address, a network address, an Internet address, or the like. As an example, the address element 110 can be relied upon to establish a communication session between the user device 102 and the computing device 104 or other devices and/or networks. As a further example, the address element 110 can be used as an identifier or locator of the user device 102. In an aspect, the address element 110 can be persistent for a particular network.

In an aspect, the service element 112 can comprise an identification of a service provider associated with the user device 102 and/or with the class of user device 102. As an example, the service element 112 can comprise information relating to or provided by a communication service provider (e.g., Internet service provider) that is providing or enabling communication services to the user device 102. As a further example, the service element 112 can comprise information relating to a preferred service provider for one or more particular services relating to the user device 102. In an aspect, the address element 110 can be used to identify or retrieve the service element 112, or vice versa. As a further example, one or more of the address element 110 and the service element 112 can be stored remotely from the user device 102 and retrieved by one or more devices such as the user device 102 and the computing device 104. Other information can be represented by the service element 112.

In an aspect, the computing device 104 can be a server for communicating with the user device 102. As an example, the computing device 104 can communicate with the user device 102 for providing services. In an aspect, the computing device 104 can allow the user device 102 to interact with remote resources such as data, devices, and files. As an example, the computing device 104 can be configured as central location (e.g., a headend, or processing facility), which can receive content (e.g., data, input programming) from multiple sources. The computing device 104 can combine the content from the various sources and can distribute the content to user (e.g., subscriber) locations via a distribution system.

In an aspect, the computing device 104 can manage the communication between the user device 102 and a database 114 for sending and receiving data therebetween. As an example, the database 114 can store a plurality of files (e.g., web pages), user identifiers or records, or other information. As a further example, the user device 102 can request and/or retrieve a file from the database 114. In an aspect, the database 114 can store information relating to the user device 102 such as the address element 110 and/or the service element 112. As an example, the computing device 104 can obtain the device identifier 108 from the user device 102 and retrieve information from the database 114 such as the address element 110 and/or the service elements 112. As a further example, the computing device 104 can obtain the address element 110 from the user device 102 and can retrieve the service element 112 from the database 114, or vice versa. Any information can be stored in and retrieved from the database 114. The database 114 can be disposed remotely from the computing device 104 and accessed via direct or indirect connection. The database 114 can be integrated with the computing system 104 or some other device or system.

In an aspect, one or more access points 116 can be in communication with a network such as network 105. As an example, one or more of the access points 116 can facilitate the connection of a device, such as user device 102, to the network 105. As a further example, one or more of the access points 116 can be configured as a wireless access point (WAP). In an aspect, one or more access points 116 can be configured to allow one or more wireless devices to connect to a wired and/or wireless network using Wi-Fi, Bluetooth, or similar standard.

In an aspect, the access points 116 can be configured as a mesh network. As an example, one or more access points 116 can comprise a dual band wireless access point. As an example, the access points 116 can be configured with a first service set identifier (SSID) (e.g., associated with a user network or private network) to function as a local network for a particular user or users. As a further example, the access points 116 can be configured with a second service set identifier (SSID) (e.g., associated with a public/community network or a hidden network) to function as a secondary network or redundant network for connected communication devices.

In an aspect, one or more access points 116 can comprise a dual band wireless access point. As an example, the access points 116 can be configured with a first service set identifier (SSID) to function as a general network. As a further example, the access points 116 can be configured with a second service set identifier (SSID) to function as an emergency network, government network, secure network, or limited use network, or a combination thereof.

In an aspect, one or more access points 116 can each comprise one or more first identifiers 118. As an example, one or more identifiers can be one or more media access control addresses (MAC addresses). As a further example, one or more first identifiers 118 can be one or more unique identifiers for facilitating communications on the physical network segment. In an aspect, each of the access points 116 can comprise one or more first identifiers 118. As an example, the first identifiers 118 can be associated with a physical location of the access points 116. As a further example, the first identifiers 118 can comprise one or more of an IP Address, serial number, latitude/longitude, geo-encoding, custom assigned unique identifier, global unique identifier (GUID), and the like.

In an aspect, other data points and/or devices can be assigned one or more second identifiers 120 (e.g., class 2 identifiers). As an example, the second identifiers 120 can be assigned to one or more routers, terminals, cable modem termination systems TS, switches, and/or Geo Polygon or network aggregation points with many routers or chosen service type. As a further example, the second identifiers 120 can be relied upon to make decisions for provisioning one or more access points 116. In an aspect, the second identifiers 120 can be used to identify a group of one or more access points 116 that are in communication with a particular device. As such, the one or more access points 116 can be provisioned as a group.

Figure 2:
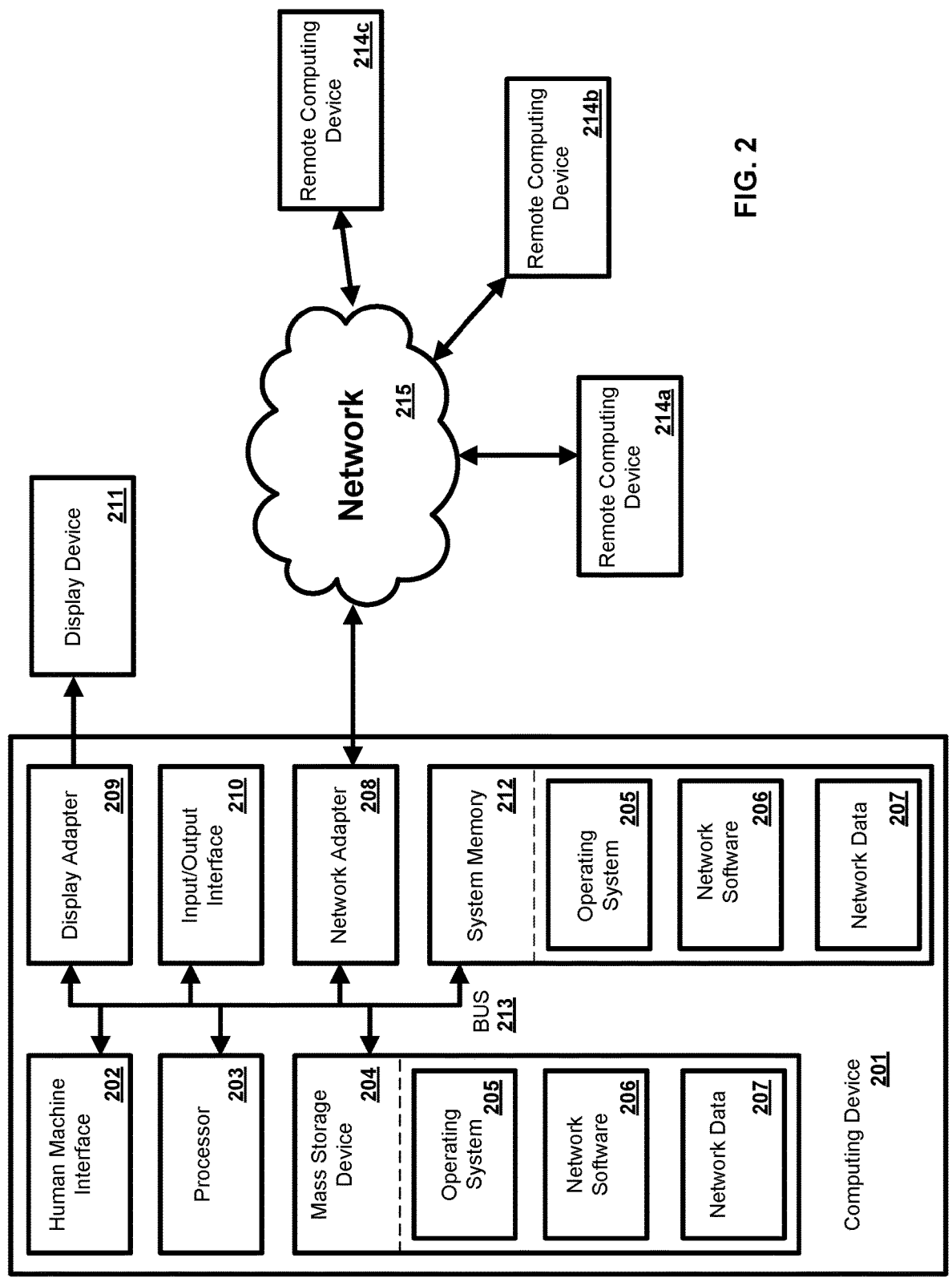
FIG. 2 is a block diagram of an exemplary computing device.

In an exemplary aspect, the methods and systems can be implemented on a computing system such as computing device 201 as illustrated in FIG. 2 and described below. By way of example, one or more of the user device 102 and the computing device 104 of FIG. 1 can be a computer as illustrated in FIG. 2. Similarly, the methods and systems disclosed can utilize one or more computers to perform one or more functions in one or more locations. FIG. 2 is a block diagram illustrating an exemplary operating environment for performing the disclosed methods. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The present methods and systems can be operational with numerous other general purpose or special purpose computing system environments or configurations. Examples of well known computing systems, environments, and/or configurations that can be suitable for use with the systems and methods comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed systems and methods can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed methods can also be practiced in grid-based and distributed computing environments where tasks are performed by remote processing devices that are linked through a communications network. In a distributed computing environment, program modules can be located in both local and remote computer storage media including memory storage devices.

Further, one skilled in the art will appreciate that the systems and methods disclosed herein can be implemented via a general-purpose computing device in the form of a computing device 201. The components of the computing device 201 can comprise, but are not limited to, one or more processors or processing units 203, a system memory 212, and a system bus 213 that couples various system components including the processor 203 to the system memory 212. In the case of multiple processing units 203, the system can utilize parallel computing.

The system bus 213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 213, and all buses specified in this description can also be implemented over a wired or wireless network connection and each of the subsystems, including the processor 203, a mass storage device 204, an operating system 205, network software 206, network data 207, a network adapter 208, system memory 212, an Input/Output Interface 210, a display adapter 209, a display device 211, and a human machine interface 202, can be contained within one or more remote computing devices 214a,b,c at physically separate locations, connected through buses of this form, in effect implementing a fully distributed system.

The computing device 201 typically comprises a variety of computer readable media. Exemplary readable media can be any available media that is accessible by the computing device 201 and comprises, for example and not meant to be limiting, both volatile and non-volatile media, removable and non-removable media. The system memory 212 comprises computer readable media in the form of volatile memory, such as random access memory (RAM), and/or non-volatile memory, such as read only memory (ROM). The system memory 212 typically contains data such as network data 207 and/or program modules such as operating system 205 and network software 206 that are immediately accessible to and/or are presently operated on by the processing unit 203.

In another aspect, the computing device 201 can also comprise other removable/non-removable, volatile/non-volatile computer storage media. By way of example, FIG. 2 illustrates a mass storage device 204 which can provide non-volatile storage of computer code, computer readable instructions, data structures, program modules, and other data for the computing device 201. For example and not meant to be limiting, a mass storage device 204 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 204, including by way of example, an operating system 205 and network software 206. Each of the operating system 205 and network software 206 (or some combination thereof) can comprise elements of the programming and the network software 206. Network data 207 can also be stored on the mass storage device 204. Network data 207 can be stored in any of one or more databases known in the art. Examples of such databases comprise, DB2®, Microsoft® Access, Microsoft® SQL Server, Oracle®, mySQL, PostgreSQL, and the like. The databases can be centralized or distributed across multiple systems.

In another aspect, the user can enter commands and information into the computing device 201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 203 via a human machine interface 202 that is coupled to the system bus 213, but can be connected by other interface and bus structures, such as a parallel port, game port, an IEEE 1394 Port (also known as a Firewire port), a serial port, or a universal serial bus (USB).

In yet another aspect, a display device 211 can also be connected to the system bus 213 via an interface, such as a display adapter 209. It is contemplated that the computing device 201 can have more than one display adapter 209 and the computer 201 can have more than one display device 211. For example, a display device can be a monitor, an LCD (Liquid Crystal Display), or a projector. In addition to the display device 211, other output peripheral devices can comprise components such as speakers (not shown) and a printer (not shown) which can be connected to the computing device 201 via Input/Output Interface 210. Any step and/or result of the methods can be output in any form to an output device. Such output can be any form of visual representation, including, but not limited to, textual, graphical, animation, audio, tactile, and the like. The display 211 and computing device 201 can be part of one device, or separate devices.

The computing device 201 can operate in a networked environment using logical connections to one or more remote computing devices 214a,b,c. By way of example, a remote computing device can be a personal computer, portable computer, a smart phone, a server, a router, a network computer, a peer device or other common network node, and so on. Logical connections between the computing device 201 and a remote computing device 214a,b,c can be made via a network 215, such as a local area network (LAN) and a general wide area network (WAN). Such network connections can be through a network adapter 208. A network adapter 208 can be implemented in both wired and wireless environments. Such networking environments are conventional and commonplace in dwellings, offices, enterprise-wide computer networks, intranets, and the Internet.

For purposes of illustration, application programs and other executable program components such as the operating system 205 are illustrated herein as discrete blocks, although it is recognized that such programs and components reside at various times in different storage components of the computing device 201, and are executed by the data processor(s) of the computer. An implementation of network software 206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any methods or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The methods and systems can employ Artificial Intelligence techniques such as machine learning and iterative learning. Examples of such techniques include, but are not limited to, expert systems, case based reasoning, Bayesian networks, behavior based AI, neural networks, fuzzy systems, evolutionary computation (e.g. genetic algorithms), swarm intelligence (e.g. ant algorithms), and hybrid intelligent systems (e.g. expert inference rules generated through a neural network or production rules from statistical learning).

Figure 3:
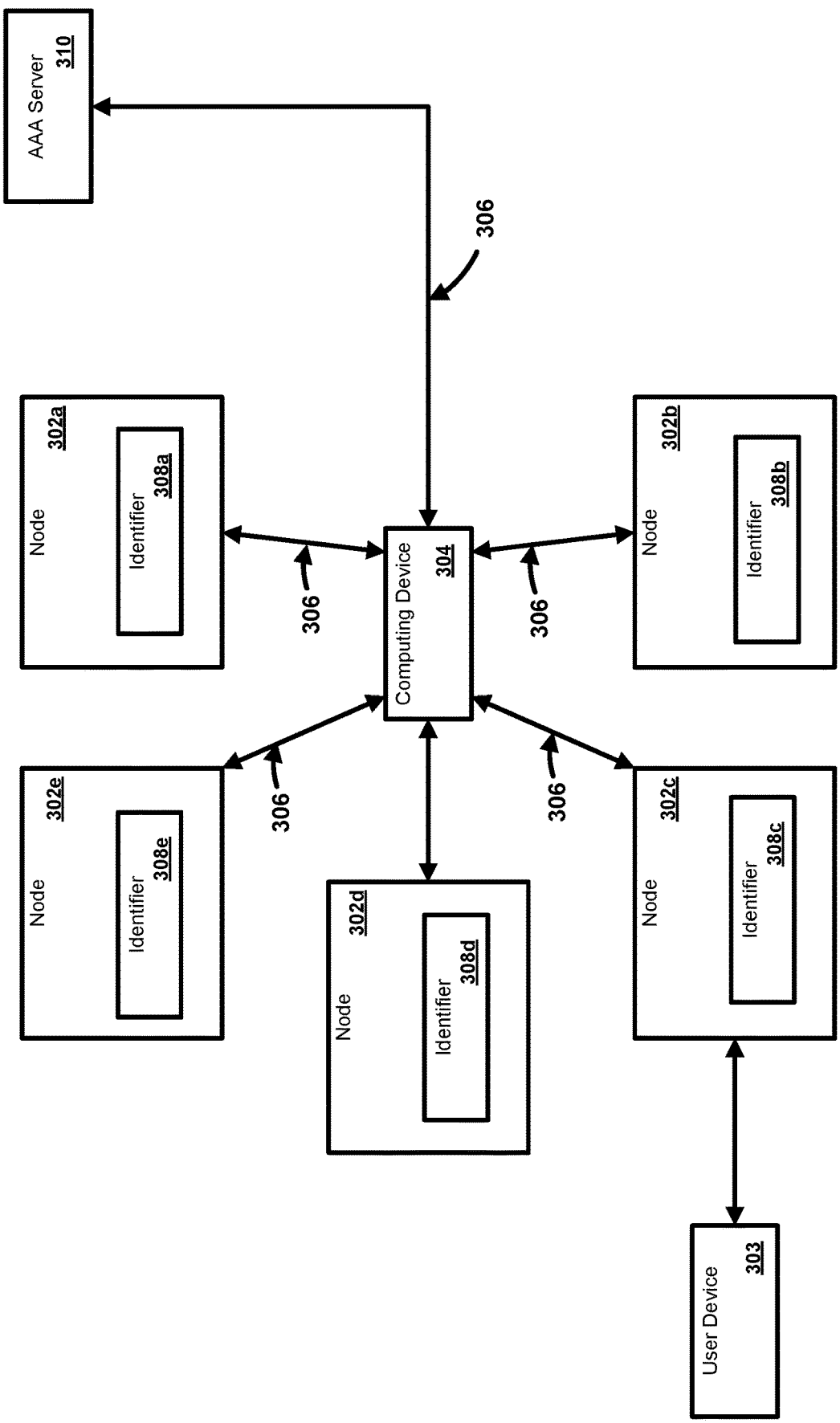
FIG. 3 is a diagram of an exemplary system and network.

FIG. 3 illustrates an exemplary system and network. In an aspect, a plurality of nodes 302a, 302b, 302c, 302d, 302e can be in communication with one or more user devices 303 and one or more computing devices 304. As an example, one or more nodes can be a network access point, router, switch, communication device, or the like. As another example, one or more user devices 303 can be an electronic device such as a computer, a smartphone, a laptop, a tablet, a set top box, a display device, or other device capable of communicating with one or more of the nodes 302a, 302b, 302c, 302d, 302e of the network. As a further example, one or more of the computing devices 304 can be a gateway, router, switch, communication device terminal server, cable modem termination system, and the like.

The methods and systems described herein, in one aspect, can provision one or more access points of a network. As an example, provisioning AP tunnels to appropriate gateway endpoints can create optimal mobility groups. As a further example, a mobility group can comprise one or more AP's in communication with a routing device such as a gateway. In an aspect, the mobility group can provide continuity of service to a user device communicating with the one or more access points of the mobility group.

In an aspect, one or more of the nodes 302a, 302b, 302c, 302d, 302e can be configured to communicate with another of the nodes 302a, 302b, 302c, 302d, 302e and/or one or more of the computing devices 304 via one or more communication paths 306. In an aspect, the one or more communication paths 306 can comprise one or more uninterrupted communication links, sequential links, pre-defined paths or links, and/or intervening nodes. As an example, one or more of the communication paths can comprise one or more of the nodes 302a, 302b, 302c, 302d, 302e. As a further example, one or more of the nodes 302a, 302b, 302c, 302d, 302e can be configured as a mesh network. In an aspect, one ore more of the communication paths 306 can be configured to transmit one or more services.

In an aspect, one or more of the nodes 302a, 302b, 302c, 302d, 302e can comprise one or more identifiers 308a, 308b, 308c, 308d, 308e. As an example, one or more identifiers 308a, 308b, 308c, 308d, 308e can be a media access control address (MAC address). As a further example, one or more identifiers 308a, 308b, 308c, 308d, 308e can comprise one or more of an IP Address, serial number, latitude/longitude, geo-encoding, custom assigned unique identifier, global unique identifier (GUID), and the like. As a further example, one or more identifiers 308a, 308b, 308c, 308d, 308e can be a unique identifier for facilitating communications on the physical network segment. In an aspect, each of the nodes 302a, 302b, 302c, 302d, 302e can comprise a distinct identifier 308a, 308b, 308c, 308d, 308e. As an example, the identifiers 308a, 308b, 308c, 308d, 308e can be associated with a physical location of the nodes 302a, 302b, 302c, 302d, 302e.

In an aspect, a computing device 310 can be implemented to perform functions such as authentication, authorization, and accounting. Such a device can be an authentication, authorization, and accounting (AAA) server 310 and can be in communication with the computing device 304. The AAA server 310 can comprise security architecture for the network of nodes 302a, 302b, 302c, 302d, 302e or other distributed systems. As an example, the AAA server 310 can control which user devices (e.g., user device 303) are allowed access to which services. As a further example, the AAA server 310 can control the resources available to the network of nodes 302a, 302b, 302c, 302d, 302e. In an aspect, the AAA server 310 can communicate via one or more network protocols such as the RADIUS protocol or the Diameter protocol, for example.

Figure 4:
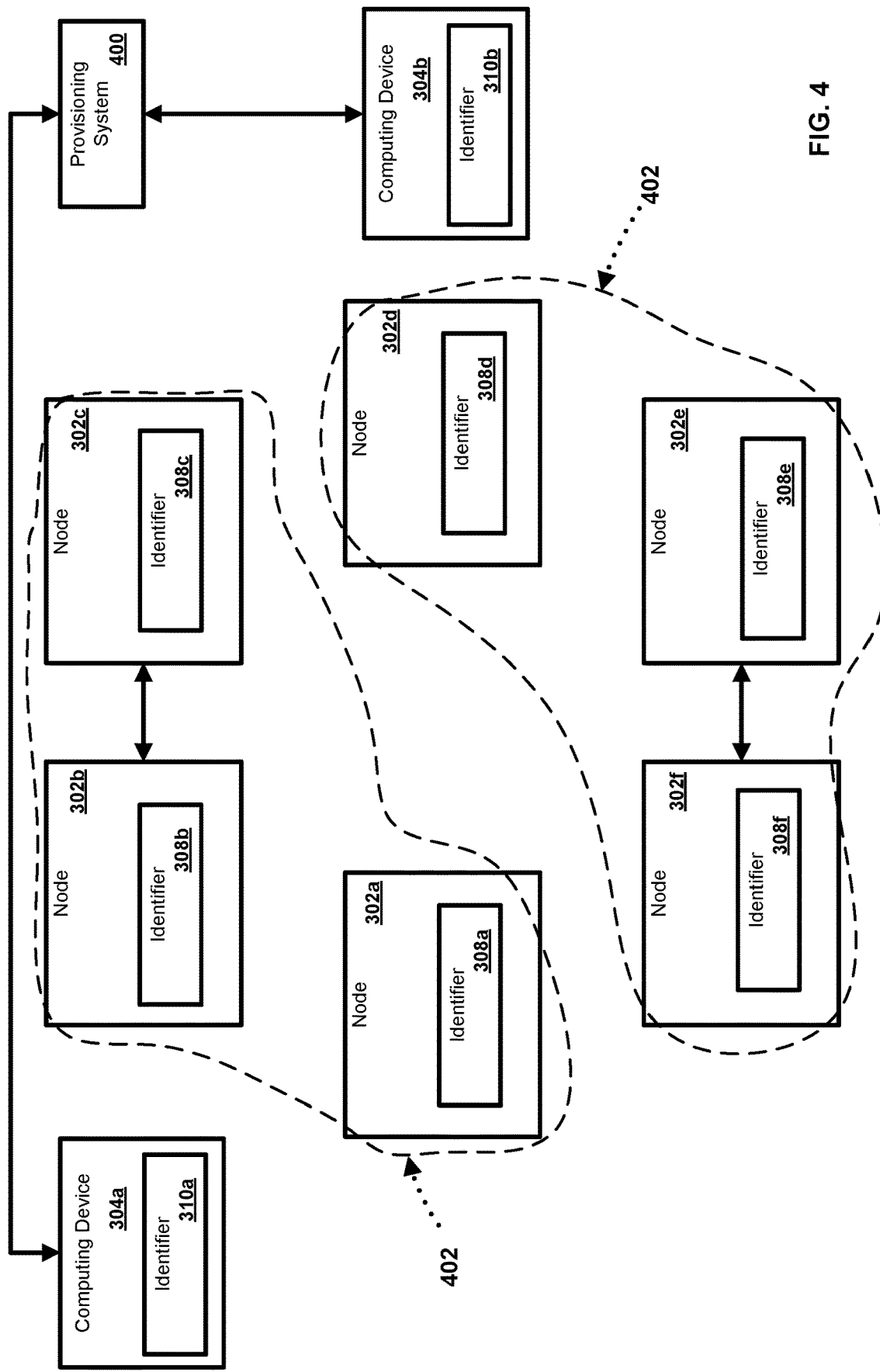
FIG. 4 is a diagram of an exemplary system and network.

FIG. 4 illustrates an exemplary system and network. In an aspect, nodes 302a, 302b, 302c, 302d, 302e or access points can be disposed in various locations. As an example, one or more nodes 302a, 302b, 302c, 302d, 302e can be a network access point, router, switch, communication device, or the like. In an aspect, nodes 302a, 302b, 302c, 302d, 302e or access points can be disposed in various locations. In another aspect, two or more of the nodes 302a, 302b, 302c, 302d, 302e or access points can be in communication (e.g., wired or wireless) with one another.

In an aspect, a provisioning system 400 can be in communication with one or more computing devices 304a, 304b for provisioning one or more of the computing devices 304a, 304b and/or devices in communication with the computing device 304a, 304b. As an example, the provisioning system 400 can be configured to assign addressable identifiers 310a, 310b to one or more of the computing devices 304a, 304b. As another example, the provisioning system 400 can be configured to assign one or more of the identifiers 308a, 308b, 308c, 308d, 308e to devices (e.g., nodes 302a, 302b, 302c, 302d, 302e) in communication with the computing device 304a, 304b. As a further example, one or more of the computing devices 304a, 304b can be a gateway, router, switch, communication device terminal server, cable modem termination system, and the like.

In an aspect, one or more of the computing devices 304a, 304b can transmit information to the provisioning system 400. As an example, the transmitted information can comprise information relating to the computing devices 304a, 304b, one or more nodes 302a, 302b, 302c, 302d, 302e in communication with the computing device, and/or one or more nodes 302a, 302b, 302c, 302d, 302e seeking communication with one or more of the computing devices 304a, 304b. As a further example, the transmitted information can comprise one or more of a MAC Address, a serviceable Address, connectivity, IP Address, Geo-Location, Local DNS Resolver, and the like.

In an aspect, the provisioning system 400 can provision one or more of the computing devices 304a, 304b and/or devices in communication with the computing device 304a, 304b. As an example, the provisioning system 400 can provision one or more of the computing devices 304a, 304b and/or devices in communication with the computing device 304a, 304b based upon the information transmitted from the computing devices 304a, 304b and/or devices in communication with the computing device 304a, 304b. As a further example, one or more of the computing devices 304a, 304b and/or devices in communication with the computing device 304a, 304b can be configured in such a manner as to establish one or more mobility groups 402. Mobility groups 402 can comprise one or more computing devices, nodes, and/or access points. As an example, provisioning access point tunnels to appropriate gateway endpoints can create optimal mobility groups 402. As a further example, one or more mobility groups 402 can comprise one or more nodes 302a, 302b, 302c, 302d, 302e in communication with one or more computing devices 304a, 304b. In an aspect, each of the mobility groups 402 can provide continuity of service to a user device communicating with the one or more access points (e.g., nodes 302a, 302b, 302c, 302d, 302e) of the respective mobility group 402.

In an aspect, the provisioning system 400 can analyze the information transmitted from the computing devices 304a, 304b and/or devices in communication with the computing device 304a, 304b to determine a configuration of one or more networks and/or mobility groups 402 relating to the one or more networks.

In an aspect, a decision to connect an access point (e.g., nodes 302a, 302b, 302c, 302d, 302e) to an appropriate one of the computing devices 304a, 304b (e.g., gateway, network routing device, wireless LAN gateway, etc.) can comprise mapping a customer premises equipment (CPE) IP address to a provisioned IP scope or range on a termination point (e.g., cable modem termination system (CMTS)) or router. As an example, available geographic information system (GIS) on a given TS or router can be used to map AP's together into a single optimal mobility group 402. As a further example, provisioning can be transmitted by service communication via HTTP/HTTPS/DHCP Options.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise identifying a computing device 304a, 304b such as a TS or router by CM MAC and or AP MAC records stored in a DHCP system. As an example, available geographic information system (GIS) on a given TS or router can be used to map access points together into a single optimal mobility group 402. As a further example, provisioning can be transmitted by service communication via HTTP/HTTPS/DHCP Options.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise using global positioning system (GPS) coordinates to assign the access point into a mobility group based on geo-spatial proximity. As an example, upstream GPS locations could be communicated via HTTP/HTTPS/DHCP Options. As a further example, provisioning can be transmitted by service communication via HTTP/HTTPS/DHCP Options.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise an access point performing a scan (e.g., via radio channel) of adjacent access points. The scan can be over a particular SSID or channel range. One or more access points can perform a lookup to determine neighboring mobility groups. As an example, an access point can provision into the same wireless LAN gateway as an identified adjacent or neighboring access point. As a further example, such a provisioning can be fulfilled by a provisioning service communicating via HTTP/HTTPS/DHCP Options or AP-to-AP communication.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise identifying the service path of the access point by billing records. As an example, the access point service path can be used to derive a mobility group.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise defining one or more mobility groups based on geo-spatial proximity.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can comprise performing DNS lookup of wireless LAN gateway to isolate one or more access points to a region that can be defined as a mobility group based on the resolving DNS server. Such provisioning can be fulfilled via customizable DNS responses based on the resolving DNS server.

In an aspect, a decision to connect an access point (e.g., nodes 302a, 302b, 302c, 302d, 302e) to one or more of the computing devices 304a, 304b (e.g., gateway, network routing device, wireless LAN gateway, etc.) can be based upon geo-location knowledge of a region serviced by a DOCSIS provisioning system. As such, a regional mobility group can be created based on geo-location knowledge. As an example, such provisioning configurations can be provided via custom TFTP boot files.

Figure 5:
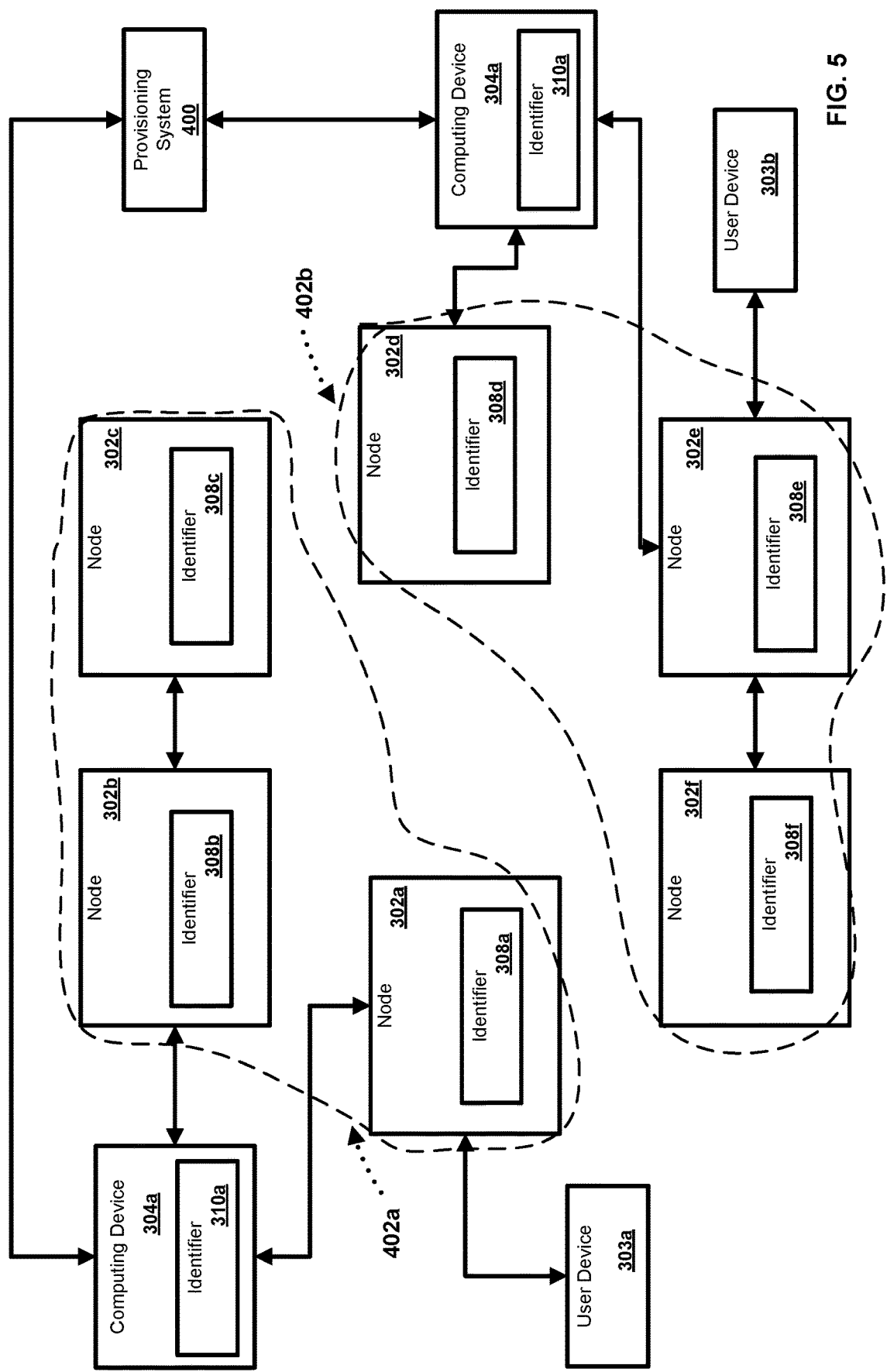
FIG. 5 is a diagram of an exemplary system and network.

As illustrated in FIG. 5, a first group of nodes 302a, 302b, 302c can be classified as part of a first mobility group 402a. In an aspect, the nodes 302a, 302b, 302c of the first mobility group 402a can be in communication with a first computing device 304a to define the first mobility group 402a. As an example, a first user device 303a can communicate with one or more of the nodes 302a, 302b, 302c of the first mobility group 402a. As a further example, the provisioning system 400 can provision an addressable element to the first user device 303a to identify the first user device 303a on the network. In an aspect, while the first user device 303a is in communication with one or more of the first nodes 302a, the provisioned addressable element can be static to maintain continuity of communication over the first mobility group 402a.

In an aspect, a second group of nodes 302d, 302e, 302f can be classified as part of a second mobility group 402b. In an aspect, the nodes 302d, 302e, 302f of the second mobility group 402b can be in communication with a second computing device 304b to define the second mobility group 402b. As an example, a second user device 303b can communicate with one or more of the nodes 302d, 302e, 302f of the second mobility group 402b. As a further example, the provisioning system 400 can provision an addressable element to the second user device 303b to identify the second user device 303b on the network. In an aspect, while the second user device 303b is in communication with one or more of the second nodes 302b, the provisioned addressable element can be static to maintain continuity of communication over the second mobility group 402b.

In an aspect, the provisioning system 400 can communicate provisioning information to one or more of the nodes 302a, 302b, 302c, 302d, 302e, 302f, the computing devices 304a, 304b, and/or the user devices 303a, 303b. Provisioning information can comprise one or more of tunnel end point IPs, radio SSID assignments, radio configuration, virtual local area network (VLAN) tags, multiprotocol label switching (MPLS) labels, and/or information relating to domain name system (DNS) servers, network time protocol (NTP) servers, simple network management protocol (SNMP) servers, radius servers, quality of service (QOS), trivial file transfer protocol (TFTP) configuration servers, and the like. As an example, the provisioning information can be communicated via a DOCSIS Boot File and/or via DNS global server load balancing (GSLB). As another example, HTTP/HTTPS Servers can be called by the AP to return provisioning information. As a further one or more dynamic host configuration protocol (DHCP) Servers can provide provisioning information via DHCP options headers during DHCP communication.

The methods and systems described herein, in one aspect, can provision one or more access points of a network. As an example, provisioning AP tunnels to appropriate gateway endpoints can create optimal mobility groups. As a further example, a mobility group can comprise one or more AP's in communication with a routing device such as a gateway. In an aspect, the mobility group can provide continuity of service to a user device communicating with the one or more access points of the mobility group.

In an aspect, in the open systems interconnection (OSI) reference model, a virtual layer 2 connection can be provided to facilitate the connectivity of one or more user devices and one or more access points of a network. In an aspect, an encapsulation of layer 2 frames over layer 3 networks enables an access point to act as a layer 2 bridge between a client and a gateway or concentrator. As an example, a user device can roam between the one or more access points to maintain connectivity to the same network or mobility group. As a further example, the user device can have a persistent identifier or address associated therewith while connected to the network.

Figure 6A:
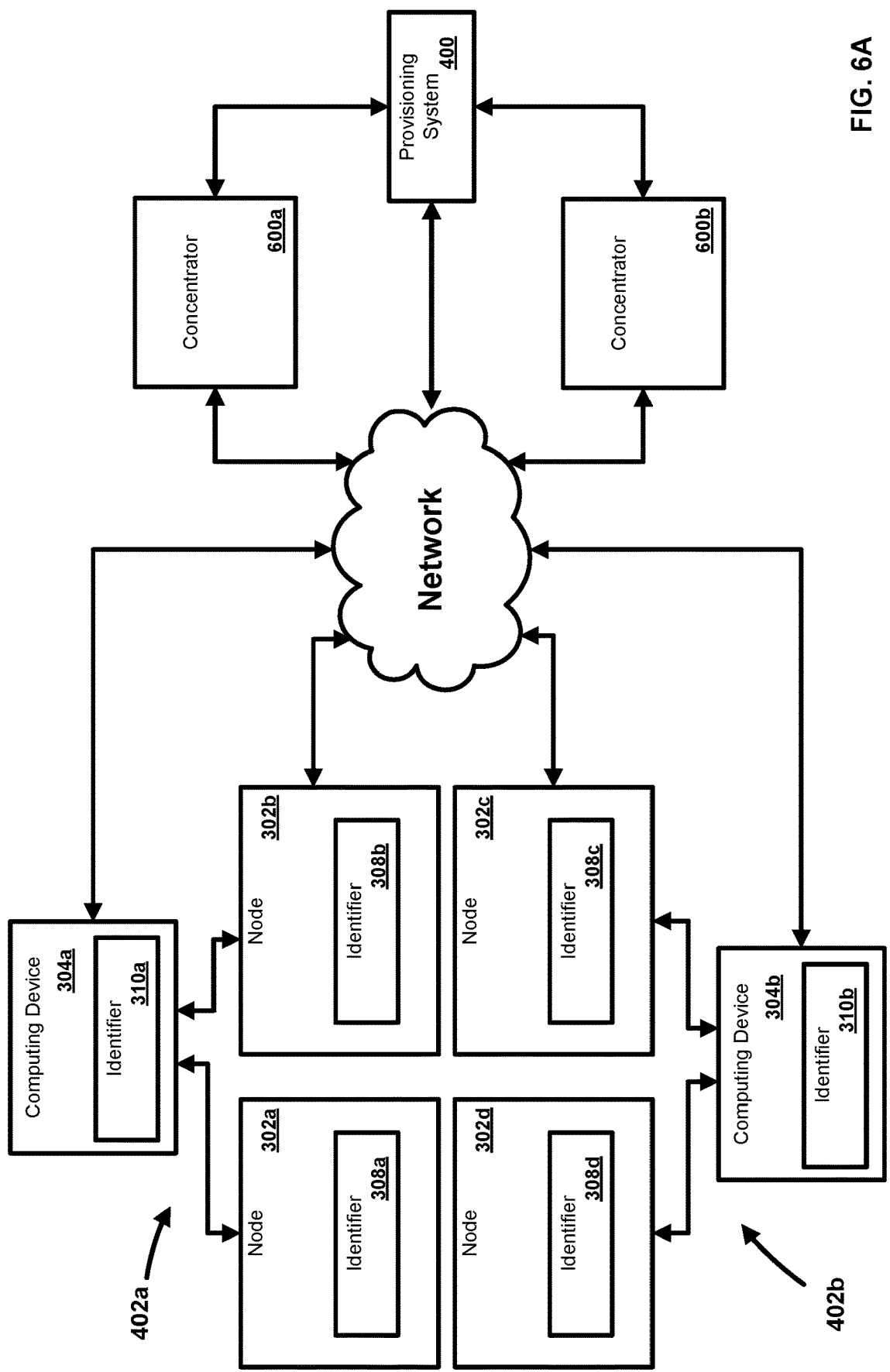
FIG. 6A is a diagram of an exemplary system and network.

As illustrated in FIG. 6A, one or more nodes 302a, 302b can be in communication with a first computing device 304a. In an aspect, the first computing device 304a can be in communication with a first concentrator 600a. As an example, the first concentrator 600a can comprise a multiplexer or similar device for combining and/or aggregating multiple channels onto a single transmission medium in such a way that multiple channels can be simultaneously active. For example, the first concentrator 600a can be configured in a local-area network (LAN) to combine transmissions from a cluster of nodes. As a further example, the first concentrator 600a can be a tunnel concentrator for combining multiple encapsulated channels or tunnels.

In an aspect, one or more nodes 302c, 302d can be in communication with a second computing device 304b. In an aspect, the second computing device 304b can be in communication with a second concentrator 600b. As an example, the second concentrator 600b can comprise a multiplexer or similar device for combining and/or aggregating multiple channels onto a single transmission medium in such a way that multiple channels can be simultaneously active. For example, the second concentrator 600b can be configured in a local-area network (LAN) to combine transmissions from a cluster of nodes. As a further example, the second concentrator 600b can be a tunnel concentrator for combining multiple encapsulated channels or tunnels.

In an aspect, the provisioning system 400 can communicate provisioning information to one or more of the nodes 302a, 302b, 302c, 302d, the computing devices 304a, 304b, and/or the concentrators 600a, 600b. As illustrated in FIG. 6B, the provisioning system 400 can create communication tunnels 602 (e.g., layer 2 tunnel, encapsulated tunnel, etc.) between nodes 302a, 302b and the first concentrator 600a. As an example, the nodes 302a, 302b can connect to the first computing device via a physical layer 2 connection. As a further example, the first computing device 304a can facilitate passing encapsulated tunneled layer 2 traffic between the nodes 302a, 302b and the first concentrator 600a. In an aspect, the provisioning system 400 can provision any number of nodes 302a, 302b, 302c, 302d or access points to establish tunnels to one or more of the concentrators 600a, 600b. As an example, any number of concentrators 600a, 600b can be used.

In an aspect, provisioning of one or more nodes 302a, 302b, 302c, 302d and resultant communication with a particular concentrator 600a, 600b can define an assignment of the one or more nodes 302a, 302b, 302c, 302d to a particular mobility group. As an example, the mobility group can treat all user devices attached to a node 302a, 302b, 302c, 302d of the mobility group as a single layer 2 network. As a further example, by knowing which computing device 304a, 304b one or more of nodes 302a, 302b, 302c, 302d is connected to, the provisioning system 400 can determine which concentrator 600a, 600b to assign to the one or more of the nodes 302a, 302b, 302c, 302d. In an aspect, the one or more of the nodes 302a, 302b, 302c, 302d assigned to the concentrator 600a can define a first mobility group. As such, a user device can roam between the one or more of the nodes 302a, 302b, 302c, 302d (or access points) and connectivity can be maintained with the first mobility group. As an example, the user device can have a persistent identifier or address associated therewith, while connected to members of the first mobility group.

Figure 7:
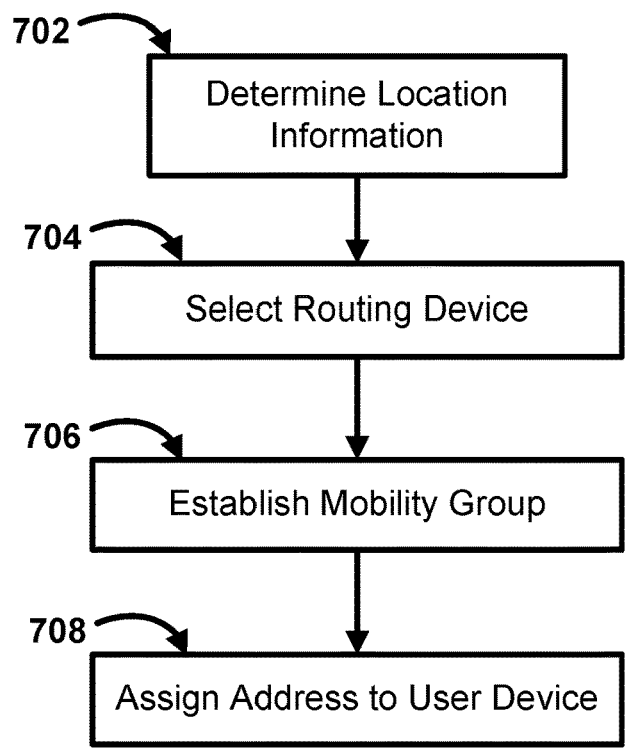
FIG. 7 is a flow chart of an exemplary method.

In an aspect, provided are methods for managing location information in a network. An exemplary method is shown in FIG. 7. The method illustrated in FIG. 7 will be discussed, for example only, in reference to FIGS. 1-6. In step 702, location information of one or more devices such as access points, computing devices, routers, user devices, TSs, and the like, can be determined. As an example, the location information can be an identification such as a MAC address, a serviceable address, an IP address, a geo-location, or the like.

In step 704, a routing device can be selected based upon the location information. In an aspect, the routing device can be a gateway device. As an example, the routing device can be a local area network gateway device. As a further example, the routing device can be a wireless local area network gateway device.

In step 706, communication between the one or more access points and the select routing device can be provided. In an aspect, the communication between the one or more access points and the select routing device can be provided to establish a mobility group comprising the one or more access points. As an example, the mobility group can provide continuity of service to a user device communicating with the one or more access points of the mobility group. As a further example, if mobility groups are not maintained properly in a given area, geographically adjacent access points could be provisioned to separate mobility groups, which would allow a break in continuity of service when roaming between the adjacent access points.

In step 708, an address can be transmitted to a user device in communication with the one or more access points of the mobility group. In an aspect, the address can be assigned to the user device. As an example, the address can be static address while the user device is in communication with one or more of the access points of the particular mobility group. Accordingly, the mobility group can provide continuity of service to the user device communicating with the one or more access points of the mobility group.

Figure 8:
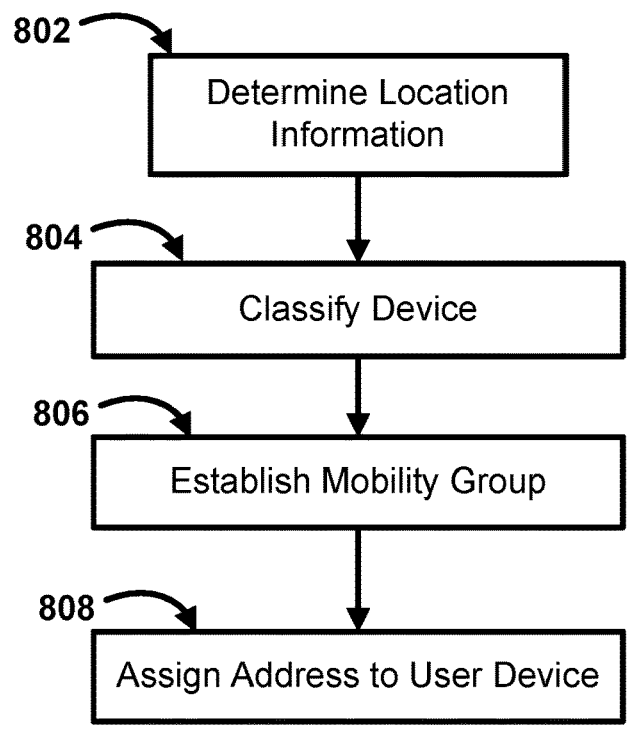
FIG. 8 is a flow chart of an exemplary method.

In an aspect, FIG. 8 illustrates an exemplary method for managing a network. The method illustrated in FIG. 8 will be discussed, for example only, in reference to FIGS. 1-6. In step 802, location information of one or more access points can be determined. As an example, the location information can be a MAC address, a serviceable address, an IP address, a geo-location, or the like.

In step 804, one or more of the plurality of access points can be classified based upon the location information. In an aspect, the access points can be classification based on geo-location, MAC address, IP address, regional identifier, service area, and the like. As an example, the access points can be classified based upon one or more common routers, TSs, switches, GEO Polygon or network aggregation points, or the like.

In step 806, a mobility group can be established. In an aspect, the mobility group can comprise the one or more access points. As an example, the mobility group can be established by transmitting provisioning information to the one or more access points. As a further example, the provisioning information can be transmitted as a DOCSIS boot file, a DHCP options header, or the like.

In step 808, an address can be transmitted to a user device in communication with the one or more access points of the mobility group. In an aspect, the address can be assigned to the user device. As an example, the address can be static address while the user device is in communication with one or more of the access points of the particular mobility group. Accordingly, the mobility group can provide continuity of service to the user device communicating with the one or more access points of the mobility group.

Figure 9:
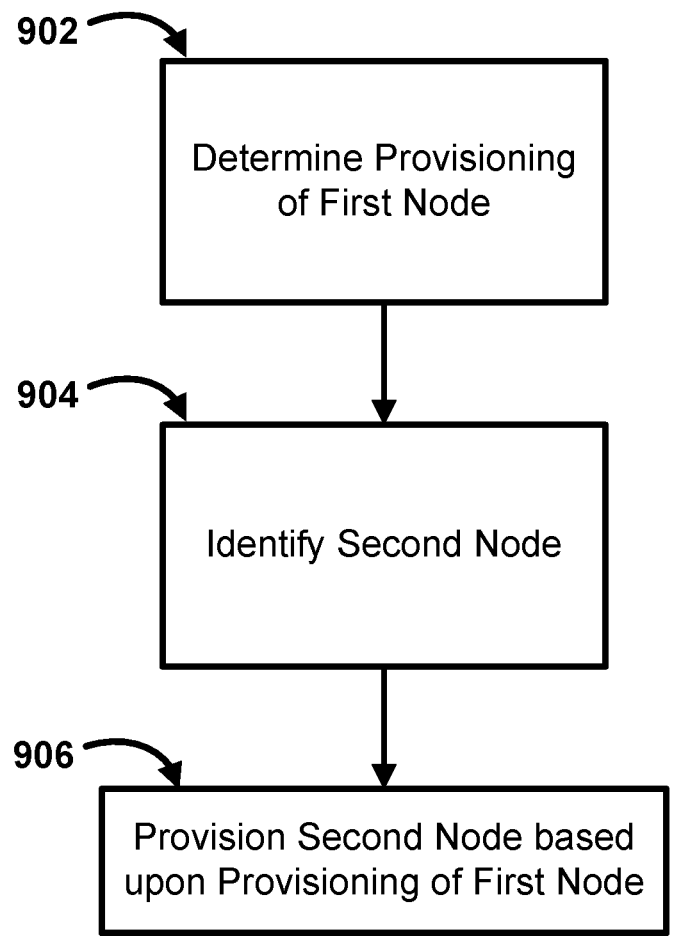
FIG. 9 is a flow chart of an exemplary method.

In an aspect, FIG. 9 illustrates an exemplary method for managing a network. The method illustrated in FIG. 9 will be discussed, for example only, in reference to FIGS. 1-6. In step 902, provisioning of a first access point can be detected. In an aspect, detected provisioning can comprise determining location information of one or more access points. As an example, the location information can be a MAC address, a serviceable address, an IP address, a geo-location, or the like.

In step 904, a second access point can be identified. In an aspect, the second access point can be within a proximity of the first access point. As an example, the second access point can be within a pre-determined proximity or range of the first access point. As a further example, the second access point can be within a defined region comprising the first access point. GIS location analysis or radio adjacency discovery of other access points in the area can also be used to identify the second access point.

In step 906, provisioning the second access point based upon the provisioning of the first access point. As an example, the second access point can be provisioned by transmitting provisioning information to the one or more access points. As a further example, the provisioning information can be transmitted as a DOCSIS boot file, a DHCP options header, or the like.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:
1. A method, comprising:
    determining location information of one or more network access points, wherein the one or more network access points are configured to communicate with a routing device;
    determining, based on the location information, a mobility group comprising the one or more network access points, wherein the mobility group is configured to communicate with the routing device via a network layer protocol; and assigning an address to a computing device in communication with at least one network access point of the mobility group, wherein the mobility group is configured to communicate with the computing device via the address and via a physical layer protocol, and wherein the mobility group is further configured to bridge communication between the computing device and the routing device via encapsulation of physical layer traffic associated with the address within network layer traffic.

2. The method of claim 1, wherein the location information comprises one or more of a MAC address, a serviceable address, an IP address, a geographic location, or a geographic region.

3. The method of claim 1, wherein the routing device comprises a gateway device.

4. The method of claim 1, further comprising sending, to the one or more network access points, provisioning information to establish the mobility group, wherein the provisioning information comprises one or more of a tunnel endpoint Internet Protocol (IP) address, radio service set identifier (SSID) assignments, a radio configuration, virtual local area network (VLAN) tags, or multiprotocol label switching (MPLS) labels.

5. The method of claim 1, wherein the address is persistent for the computing device as the computing device communicates with the one or more network access points of the mobility group.

6. The method of claim 1, wherein determining the location information comprises:
performing, at a first network access point of the one or more network access points, a scan for network access points within range of the first network access point, and
identifying the routing device as a termination point for tunneling communications from the one or more network access points of the mobility group to the termination point.

7. The method of claim 1, wherein the mobility group is configured to communicate with computing devices via a single physical layer network.

8. A method, comprising:
determining location information of a plurality of computing devices;
determining, based on the location information, a classification of one or more computing devices of the plurality of computing devices;
sending, based on the classification, provisioning information to the one or more computing devices to establish a mobility group, wherein the mobility group is configured to communicate with a routing device via a network layer protocol; and
assigning an address to a user device in communication with at least one computing device of the mobility group, wherein the mobility group is configured to communicate with the user device via the address and via a physical layer protocol, and wherein the mobility group is further configured to bridge communication between the user device and the routing device via encapsulation of physical layer traffic associated with the address within network layer traffic.

9. The method of claim 8, wherein the location information comprises one or more of a MAC address, a serviceable address, an IP address, a geographic location, or a geographic region.

10. The method of claim 8, wherein the one or more computing devices comprise at least one of a network access point or a gateway device.

11. The method of claim 8, wherein the mobility group is configured to communicate with user devices via a single physical layer network.

12. The method of claim 8, wherein the address is persistent for the user device as the user device communicates with the one or more computing devices of the mobility group.

13. The method of claim 8, wherein determining the location information of the plurality of computing devices comprises performing, at a first computing device of the plurality of computing devices, a scan for one or more computing devices of the plurality of computing devices within range of the first computing device.

14. The method of claim 8, wherein the provisioning information comprises a Data Over Cable Service Interface Specification (DOCSIS) boot file, and wherein the provisioning information is transmitted via a Dynamic Host Configuration Protocol (DHCP) options header.

15. A method, comprising:
determining provisioning information corresponding to a first access point, wherein the provisioning information assigns an address to a computing device;
determining a second access point within a proximity of the first access point, wherein the first access point and the second access point are configured to communicate with a routing device via a network layer protocol; and
provisioning, based on the provisioning information, the second access point, wherein the first access point and the second access point are configured to communicate with a user device via the address and via a physical layer protocol, and wherein the first access point and the second access point are further configured to bridge communication between the user device and the routing device via encapsulation of physical layer traffic associated with the address within network layer traffic.

16. The method of claim 15, wherein the first access point and the second access point are associated with a mobility group comprising a plurality of access points, and wherein the mobility group provides continuity of service to the user device.

17. The method of claim 16, wherein the address is persistent for the user device as the user device communicates with the plurality of access points of the mobility group.

18. The method of claim 16, wherein the mobility group is configured to communicate with computing devices via a single physical layer network.

19. The method of claim 15, wherein the provisioning information comprises one or more of a tunnel endpoint Internet Protocol (IP) address, radio service set identifier (SSID) assignments, a radio configuration, virtual local area network (VLAN) tags, or multiprotocol label switching (MPLS) labels.

20. The method of claim 15, wherein the provisioning information comprises information relating to one or more of: domain name system (DNS) servers, network time protocol (NTP) servers, simple network management protocol (SNMP) servers, radius servers, a quality of service (QOS), or trivial file transfer protocol (TFTP) configuration servers.

\* \* \* \* \*